United States Patent [19]

Field

[11] Patent Number: 4,819,688

[45] Date of Patent: Apr. 11, 1989

[54] VOLUMETRIC, SELF-RESETTING, HYDRAULIC FUSE

[75] Inventor: Stanley R. Field, Garden Grove, Calif.

[73] Assignee: Brunswick Corporation, Skokie, Ill.

[21] Appl. No.: 240,621

[22] Filed: Sep. 6, 1988

Related U.S. Application Data

[63] Continuation-in-part of Ser. No. 147,272, Jan. 22, 1988, abandoned.

[51] Int. Cl.$^4$ ............................................. F16K 17/26
[52] U.S. Cl. .................. 137/493.6; 137/498; 251/16
[58] Field of Search ............... 137/493.6, 498; 251/15, 251/16

[56] References Cited

U.S. PATENT DOCUMENTS

| | | | |
|---|---|---|---|
| 236,151 | 1/1881 | Furney | 251/16 |
| 2,512,190 | 6/1950 | Waterman | 251/16 X |
| 2,554,390 | 5/1951 | Stevenson | 251/16 X |
| 2,555,334 | 6/1951 | Green | 251/16 |
| 2,592,486 | 4/1952 | Stark | 251/16 |
| 2,592,487 | 4/1952 | Stark | 251/16 |
| 2,656,855 | 10/1953 | Booth | 251/16 X |
| 2,772,065 | 11/1956 | Thomas | 251/16 |
| 3,494,375 | 2/1970 | Henaughan | 251/16 X |
| 3,880,398 | 4/1975 | Rubrich | 137/498 X |

Primary Examiner—John Rivell
Attorney, Agent, or Firm—Art Greif

[57] ABSTRACT

A hydraulic fuse or cut-off device divides fluid flow into: (i) a primary fluid stream; and (ii) a secondary fluid stream having a substantially constant, but small ratio of flow to said primary stream. The secondary stream exerts pressure on a timing piston which thereby monitors the entire flow and causes the fuse to cut-off when a predetermined volume of fluid has passed through the device. The fuse includes a regulating piston for building inlet pressure to a value sufficient to develop the power necessary to drive the timing piston. Greater simplicity of the component parts and decreased sensitivity to contamination results from the use of a small fluid orifice to control the secondary stream. This is achieved by fitting the regulating piston with an inwardly directed flange, just touching the peripheral surface of a slightly tapered, central pin—whereby the taper of the pin causes the orifice to be created as the regulating piston is caused to slide as a result of the primary fluid flow.

1 Claim, 5 Drawing Sheets

VOLUMETRIC, SELF-RESETTING, HYDRAULIC FUSE

This application is a continuation-in-part of application Ser. No 07/147,272, filed Jan. 22, 1988 now abandoned.

TECHNICAL FIELD

This invention relates to a hydraulic fuse and more particularly concerns itself with an in-line hydraulic fuse or sensor that monitors the quantity of hydraulic fluid passing through the device and thereafter blocks the flow when a pre-selected quantity of fluid has passed through.

BACKGROUND ART

Devices employed to monitor and interrupt fluid flow have generally employed buoyant pistons as the timing element to cut-off such flow after a predetermined volume of fluid has passed through the fuse. Examples of such buoyant piston devices are shown in U.S. Pat. Nos. 2,512,190; 2,518,988; 2,592,486; and 2,554,390. Reliance on a buoyant piston configuration necessitates that a hydraulic fuse be constructed, utilizing very close tolerances and a large number of parts. Recently, a fuse has been described (U.S. Pat. No. 4,655,245) which employs a regulating element for building inlet pressure to a value sufficient to develop the power necessary to drive the timing element—eliminating the requirement for timing element buoyancy. The addition of a regulating element (a movable sleeve in the '245 patent) permits the fuse to function more accurately at lower flow conditions as compared with the predecessor, buoyant piston systems. Since the regulating element permits power to develop sufficient to actuate the timing element, the latter can more accurately measure the quantity of fluid as it passes through the valve, generally independent of the rate of flow, such that actuation of the shut-off mechanism is reliable both at high and low flow rates.

The '245 patent employs a basic spool and sleeve mechanism for both the regulation and the timing elements. Thus, with respect to the regulating element, the metering slots are near the outer periphery of the cylinder—resulting in a large circumferential length (and therefore large surface area) which necessitates the use of tight tolerances to achieve accurate metering. Not only are tight tolerances disadvantageous in that they are more costly to produce, but they are also more sensitive to contamination and to variations in temperature. With respect to the timing element, since the spool and sleeve mechanism has to effect a fluid-tight seal between the outside diameter of the spool and the inside diameter of the sleeve, two additional disadvantages result: (i) concern with the concentricity of the spool; and (ii) the requirement to employ O-ring seals or the equivalent to prevent leakage—thereby incurring increased friction, which detracts from accuracy, particularly at low flow rates and temperatures.

DISCLOSURE OF INVENTION

Rather than utilizing the relative movement between the regulating, sleeve element and a spool guide element to control both the timing stream (i.e., the fluid stream which controls the timing element) and the primary flow stream exiting the primary port; the instant invention utilizes relative movement between an inwardly directed flange of the regulating element and a centrally located pin, to form a comparatively small, surface area metering orifice—eliminating the need for tight tolerances or clearances. The instant device is therefore less costly to produce, less sensitive to contamination and temperature variations, and is easier to adjust. As a result, simplicity of the fuse's component parts not only drives down production costs, but also ensures both a lower failure rate on the assembly line and a higher reliability rate in actual use. These and other advantages of the instant invention will become more apparent from a reading of the following description, when read in conjunction with the appended claims and the following drawings.

BRIEF DESCRIPTION OF DRAWINGS

FIG. 4 shows the "shut-off" position.

MODES FOR CARRYING OUT THE INVENTION

Figure 1:
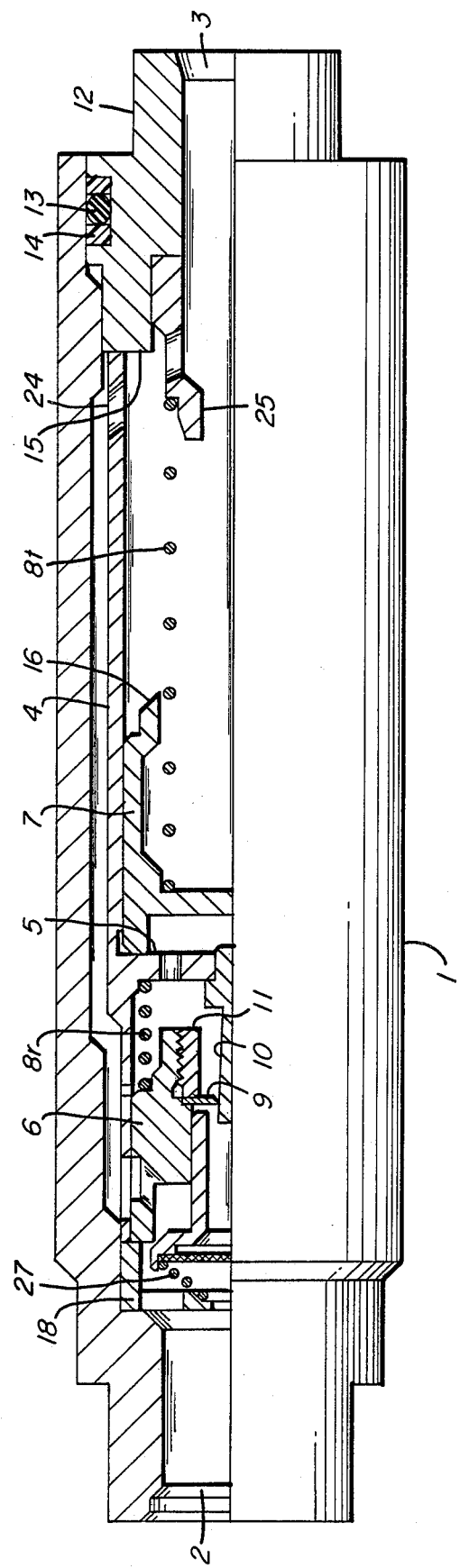
FIG. 1 is a side elevation, partly in longitudinal section, of the inventive fuse, in its initial or open position.

FIG. 1 is a partial section, showing the essential components of the fuse in its initial or open position. The fuse consists of cylindrical housing 1, having a bore or cavity which includes inlet port 2 and outlet port 3. As illustrated, the primary fluid flow ("fused flow direction") is from left to right. The housing includes guide tube 4 and stop 5. Stop 5 divides the interior volume of tube 4 into what may be considered two chambers—the upstream chamber, which houses regulating piston 6, and the downstream chamber, which houses timing piston 7—each of such pistons being biased in the reverse flow direction by respective springs $8r$ and $8t$. Desirably, the combination of stop 5 and guide element 4 will be constructed as an integral member. If should be apparent, however, that the combination may be formed by joining two or more pieces. Affixed to piston 6 is flange 9, the inside diameter of which abuts the peripheral surface of pin 10. At least a portion of the peripheral surface of 10 is tapered in the direction of fused flow. (The sharpness of the taper is exaggerated in the figures for purposes of illustration, but would normally be about 1°.) Thus, as fluid pressure increases above the threshold established by spring $8r$, flange 9 moves axially (to the right in the figures), resulting in an increased clearance between the edge or inside diameter of 9 and the peripheral surface of 10—thereby increasing the orifice which is created as a result of such movement. While flange 9 may be integral with piston 6, it is preferably affixed thereto by nut 11, permitting ready replacement or adjustment of the flange. In the construction illustrated, the various parts (some of which will be described later) are inserted into housing 1 and held in place by end cap 12, leakage around the peripheral surface of which can be prevented by resilient rings, e.g., rubber O-ring 13 and back-up, Teflon ring 14. End cap 12 may carry shoulder 15 which serves to form a seat for poppet 16 located at the downstream end of piston 7, such that travel of piston 7 to its downstream limit will result in poppet 16 forming a positive closure of the primary fluid path (shown by the arrows in FIGS. 2-4).

Figure 2:
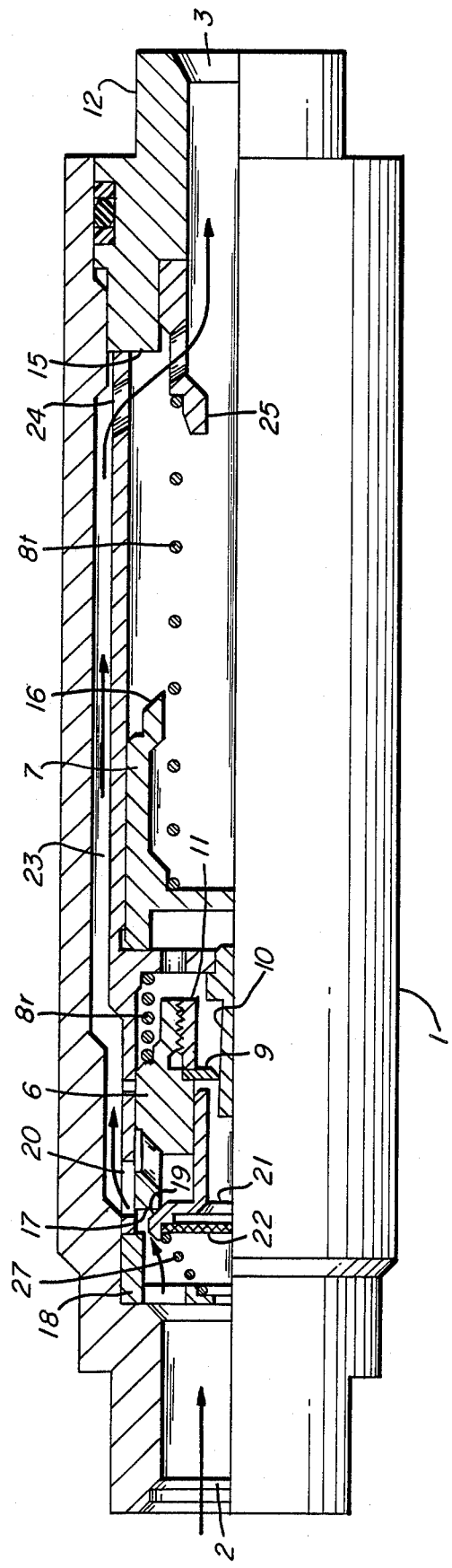
FIGS. 2 through 4 show analogous side elevations, partly in longitudinal section, illustrating the progression of both the regulating piston and the timing piston, at various stages of volumetric flow, whereby

The operation of the fuse and the function of the various elements not yet described can better be understood by referring to FIGS. 2 through 5. As shown by the arrows, fluid enters the fuse through inlet port 2. The fluid works across shoulder 17, located at the upstream end of regulating piston 6. In the initial ("at rest") position shown in FIG. 1, piston 6 bottoms against stop 18 and poppet 19. However, as illustrated in FIG. 2, reverse flow poppet 19 and piston 6 are moved slightly away by the fluid pressure (when sufficient to overcome the bias of spring 8r), allowing flow to begin, both through a portion of slot 20 and through central port 21—protected against contamination by screen filter 22. As a result of the opening of outlet slot 20, flow enters the annular region 23 formed between the outer surface of guide 4 and the inner surface of the housing. Thereafter, this primary fluid stream travels through inlet slot 24, re-enters the interior of guide 4, and exits the fuse through outlet port 3. In the embodiment illustrated, fluid must first pass through holes in spring retainer 25 prior to exiting outlet port 3. It should be apparent that the spring retainer could be otherwise supported—permitting flow to pass directly from slot 24 to port 3.

As noted above, when flow through the primary fluid path becomes possible, a second stream of flow is initiated through central port 21 and then through the orifice created (as a result of the movement of piston 6) between flange 9 and pin 10—developing enough pressure to overcome the bias of spring 8t and move timing piston 7. Thus, the rate of flow of this second stream and, concomitantly, the timing of shut-off piston 7 are controlled by the orifice formed between self-cleaning, tapered pin 10 and the inside diameter of the flange 9. As illustrated, pin 10 is comprised of integral, cylindrical portions, in which the smaller diameter cylindrical portion is tapered toward the fused flow direction to provide an increase in the orifice so-formed, as regulating piston 6 and therefore flange 9 moves in the fused direction.

Figure 3:
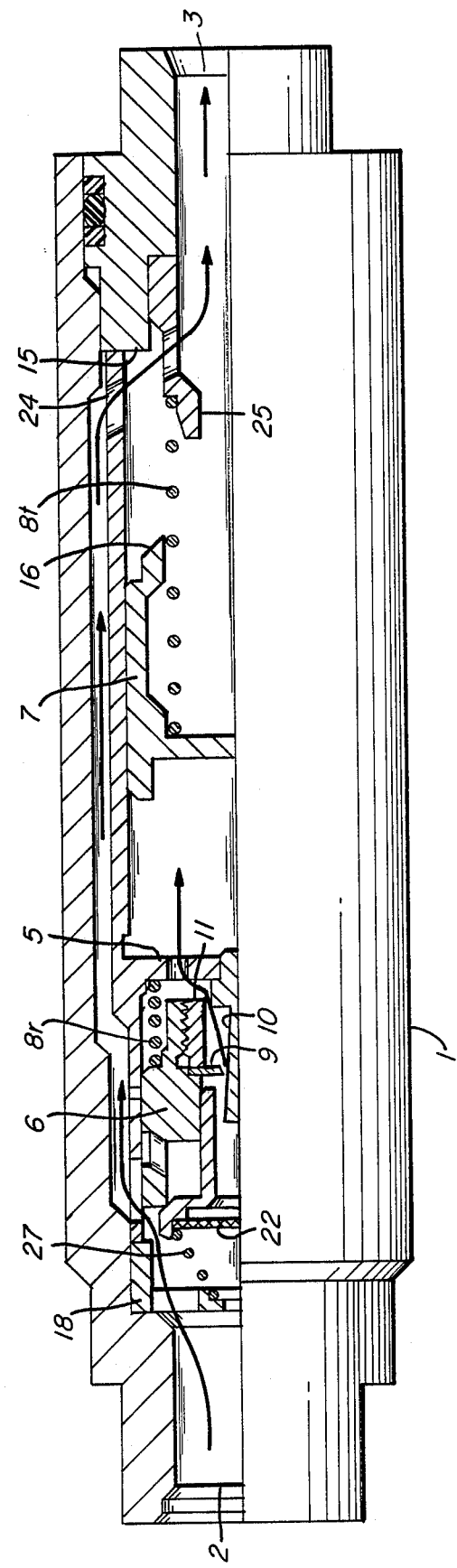
Figure 4:
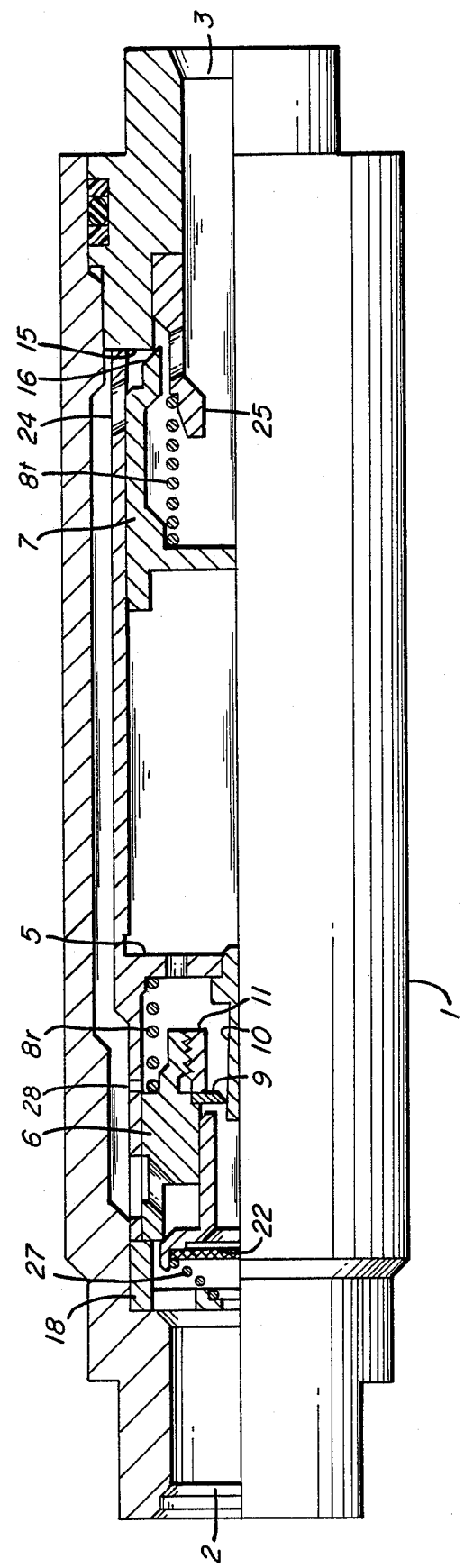

FIG. 3 shows the position of piston 7 while the fuse is permitting full flow, such that the piston is timing the volume of fluid passed through the fuse before it reaches the fused position illustrated in FIG. 4. As shown in FIG. 4, poppet 16 is seated against shoulder 15—shutting-off the primary flow path. Under this fused condition, fluid pressure is no longer working against regulating piston 6, such that spring 8r will therefore urge regulating piston 6 back to the initial, closed position.

Figure 5:
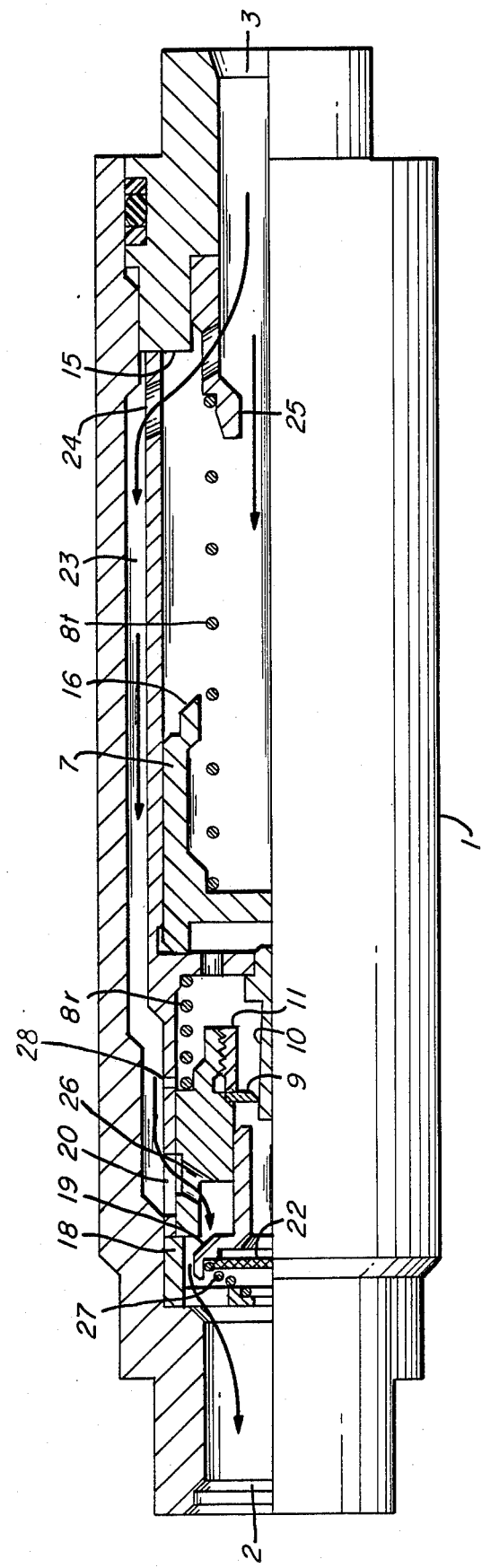
FIG. 5, likewise, is a partly sectioned longitudinal elevation, showing the elements in reverse or "free flow" position.

The reverse, essentially free-flow condition, permitted by the design of the fuse, is shown in FIG. 5. The fluid pressure working against the left-hand portion of timing piston 7 can be relieved through exit port 28. Since timing piston 7 is otherwise unrestrained (until it meets stop 5) in the reverse flow direction, fluid acting against the right-hand portion of piston 7 forces it to the left, opening slot 24, permitting reverse flow through annular region 23 and through slot 20 and port 26, urging poppet 19 in the reverse direction, i.e., to the left in FIG. 5. In this reverse direction, poppet 19 is restrained only by check return spring 27, which desirably is provided with a low spring rate. It is therefore seen that reverse flow can be essentially "free", e.g., of the order of about 3 psi, since such flow has only to overcome the rather minimal spring bias.

The regulating piston limits the amount of pressure rise, which would otherwise occur at high flow rates, e.g., to 15 to 17 psi. The regulated pressure works across the self-cleaning orifice (created between flange 9 and taper-pin 10) to effect closure of shut-off poppet 16 more rapidly at high flow rates, thereby maintaining the same pre-selected volume capacity. As temperature variation affects fluid characteristics (e.g., as temperature increases, viscosity decreases, and fluid passes more easily through the orifice) the regulating piston moves more or less to compensate and limit the pre-selected volume capacity, so as to minimize variation resulting from such temperature differences.

I claim:
1. A hydraulic fuse comprised of,
an encircling housing having a bore,
a tubular guide element mounted and axially aligned within said housing bore, said tubular guide element having outlet and inlet slots formed in its wall, such that fluid may travel into the interior of the tubular element, and thereafter outwardly through the outlet slot, located in an upstream portion of the guide element, to an annular-like region formed between the outer surface of the guide element and the inner surface of the housing bore, and then re-enter the interior of the tubular element through the inlet slot, located in a downstream portion of the guide element, and from said interior, pass through an exit port in the fuse, the fluid path so-formed being the primary fluid path;
a regulating piston, slidably supported for axial movement within an upstream portion of the guide element, and a timing piston, slidably supported for axial movement within a downstream portion of the guide element, the pistons being reciprocated within the guide element in one direction by fluid pressure and in the opposite direction by respective biasing springs;
a cylindrical pin axially mounted within an upstream portion of the guide element, at least a portion of the pin having a peripheral surface tapering slightly in the primary direction of fluid flow;
the regulating piston having: (i) a port formed within its wall, said port being at least partially matable with the outlet slot of the guide element; (ii) a shoulder at the upstream end thereof controlling the fluid flow to said primary fluid path; and (iii) a flange facing toward the tapered, peripheral surface of the pin, such that the peripheral pin surface confronts the innermost flange surface, whereby the taper of the pin causes an orifice to be created which increases in size as the regulating piston slides in the primary flow direction, the resulting orifice permitting fluid flow from the upstream portion of the guide element to act against the timing piston causing movement of the timing piston in the primary flow direction;
the timing piston having a poppet, at the downstream end thereof, such that travel of the timing piston downstream will control the fluid flow from the inlet slot of the guide element, by closing the primary flow path at the downstream limit of the timing piston.

* * * * *